(12) United States Patent
Carpenter

(10) Patent No.: US 7,403,874 B2
(45) Date of Patent: Jul. 22, 2008

(54) METHOD AND SYSTEM FOR PRIORITIZING FORMATTING ACTIONS OF A NUMBER OF DATA FORMATTERS

(75) Inventor: Bryan F. Carpenter, Loveland, CO (US)

(73) Assignee: Verigy (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/345,045

(22) Filed: Jan. 31, 2006

(65) Prior Publication Data

US 2007/0179744 A1 Aug. 2, 2007

(51) Int. Cl.
*G06F 9/46* (2006.01)
*G06F 3/00* (2006.01)
*G06F 19/00* (2006.01)
*G06F 17/40* (2006.01)

(52) U.S. Cl. .......................... 702/189; 710/30; 718/102; 718/103; 718/104

(58) Field of Classification Search ................. 702/182, 702/189, 190; 710/30; 718/100, 102, 103, 718/104
See application file for complete search history.

(56) References Cited

U.S. PATENT DOCUMENTS

| | | | | |
|---|---|---|---|---|
| 3,449,722 A | * | 6/1969 | Tucker | 718/103 |
| 4,319,338 A | * | 3/1982 | Grudowski et al. | 710/109 |
| 4,644,467 A | * | 2/1987 | McCarthy | 710/244 |
| 5,247,675 A | * | 9/1993 | Farrell et al. | 718/103 |
| 5,630,128 A | * | 5/1997 | Farrell et al. | 718/103 |
| 5,963,911 A | * | 10/1999 | Walker et al. | 705/7 |
| 6,389,449 B1 | * | 5/2002 | Nemirovsky et al. | 718/108 |
| 6,600,569 B1 | * | 7/2003 | Osada et al. | 358/1.12 |
| 6,658,447 B2 | * | 12/2003 | Cota-Robles | 718/103 |
| 7,333,230 B2 | * | 2/2008 | Sugishita et al. | 358/1.15 |
| 7,340,742 B2 | * | 3/2008 | Tabuchi | 718/103 |
| 2001/0007570 A1 | * | 7/2001 | Mangin | 370/537 |
| 2001/0021913 A1 | * | 9/2001 | Leymann et al. | 705/7 |
| 2001/0056456 A1 | * | 12/2001 | Cota-Robles | 709/103 |
| 2003/0103777 A1 | * | 6/2003 | Nakamura et al. | 399/82 |
| 2003/0140175 A1 | * | 7/2003 | Bonar et al. | 709/314 |
| 2004/0010667 A1 | * | 1/2004 | Brenner | 711/158 |
| 2005/0120104 A1 | * | 6/2005 | Boon et al. | 709/223 |
| 2006/0248533 A1 | * | 11/2006 | Inari | 718/103 |
| 2006/0294045 A1 | * | 12/2006 | Suggs et al. | 707/1 |

* cited by examiner

*Primary Examiner*—Edward R Cosimano
(74) *Attorney, Agent, or Firm*—Holland & Hart, LLP

(57) ABSTRACT

In one embodiment, a method of prioritizing formatting actions of a number of data formatters 1) instantiates a number of threads for execution by a processing system, the number of threads sharing thread processing resources, and the number of threads including at least two threads of dissimilar priority; 2) launches a number of data formatters on the number of threads, the number of data formatters including at least two data formatters that are respectively launched on ones of the at least two threads having dissimilar priorities; and 3) periodically requests allocation of the thread processing resources for a number of highest priority active threads, wherein an active thread is a thread executing a data formatter with formatting actions to perform. Other embodiments are also disclosed.

16 Claims, 5 Drawing Sheets

METHOD AND SYSTEM FOR PRIORITIZING FORMATTING ACTIONS OF A NUMBER OF DATA FORMATTERS

BACKGROUND

When testing a circuit, test results may be logged in a "raw" format. Often, this raw format is 1) not accepted by the application programs that are used to analyze the test results, and 2) difficult for test engineers and others persons to comprehend.

As a result of the above difficulties that a raw data format presents, raw data is often converted to one or more other formats by, for example, rearranging, sorting, grouping, distilling and/or performing other operations on the data.

SUMMARY OF THE INVENTION

In one embodiment, a method of prioritizing formatting actions of a number of data formatters comprises 1) instantiating a number of threads for execution by a processing system, the number of threads sharing thread processing resources, and the number of threads including at least two threads of dissimilar priority; 2) launching a number of data formatters on the number of threads, the number of data formatters including at least two data formatters that are respectively launched on ones of the at least two threads having dissimilar priorities; and 3) periodically requesting allocation of the thread processing resources for a number of highest priority active threads, wherein an active thread is a thread executing a data formatter with formatting actions to perform.

In another embodiment, a system for prioritizing formatting actions of a number of data formatters comprises computer readable code stored on computer readable media. The computer readable code comprises 1) code number of threads sharing thread processing resources, and the number of threads including at least two threads of dissimilar priority; 2) code to launch a number of data formatters on the number of threads, the number of data formatters including at least two data formatters that are respectively launched on ones of the at least two threads having dissimilar priorities; and 3) code to periodically request allocation of the thread processing resources for a number of highest priority active threads, wherein an active thread is a thread executing a data formatter with formatting actions to perform.

Other embodiments are also disclosed.

BRIEF DESCRIPTION OF THE DRAWINGS

Illustrative embodiments of the invention are illustrated in the drawings, in which.

DETAILED DESCRIPTION

Figure 1:
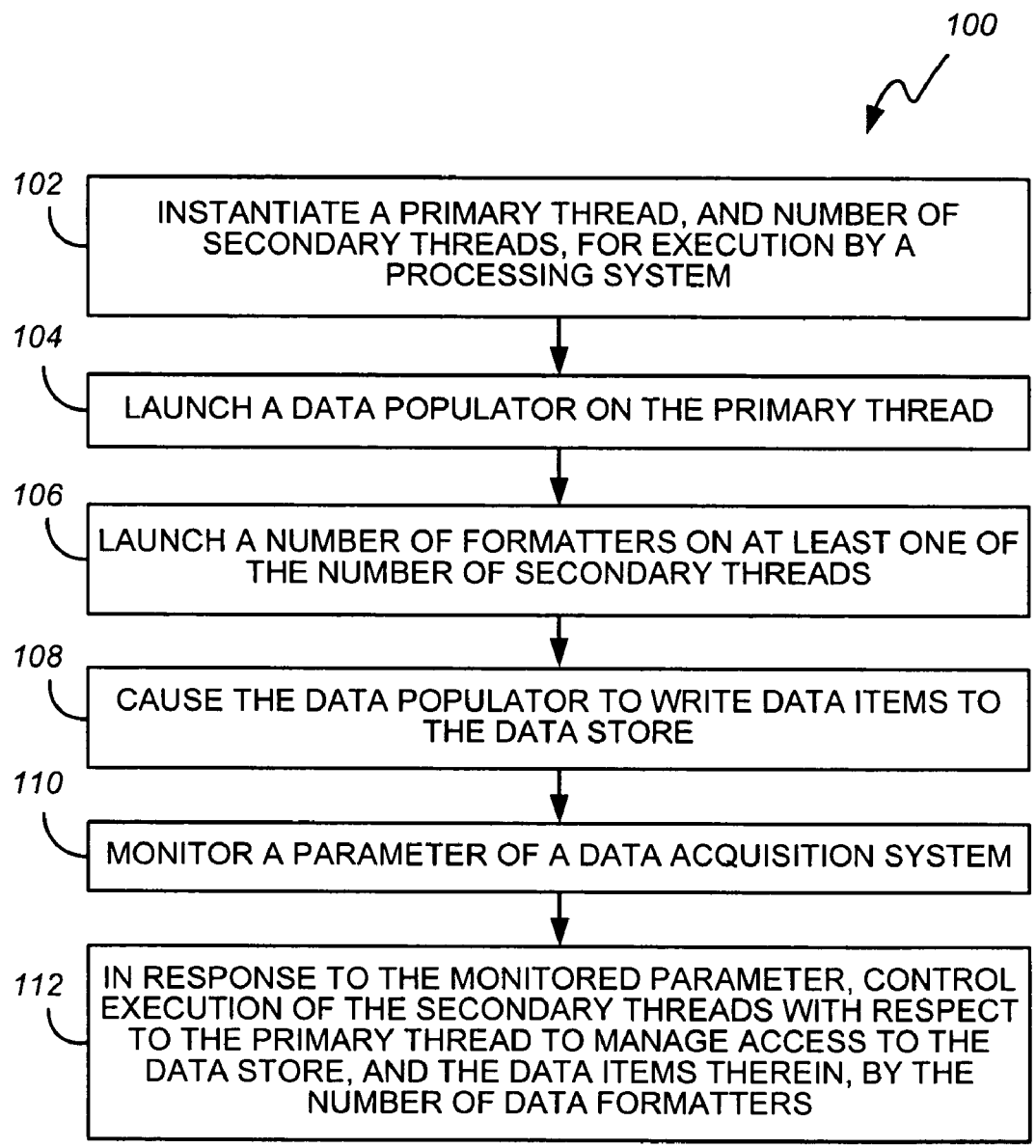
FIG. 1 illustrates a first exemplary method for managing access to a data store.

As a preliminary manner, it is noted that, in the following description, like reference numbers appearing in different drawing figures refer to like elements/features. Often, therefore, like elements/features that appear in different drawing figures will not be described in detail with respect to each of the drawing figures.

FIG. 1 illustrates a first exemplary method 100 for managing access to a data store. In accord with the method 100, a primary thread, and a number of secondary threads, are instantiated for execution by a processing system (see block 102). A data populator is then launched on the primary thread (block 104), and a number of data formatters are launched on at least one of the number of secondary threads (block 106). In one embodiment, a single data formatter is launched on each of the secondary threads. In other embodiments, one or more of the secondary threads may each have multiple data formatters executing therein.

After launching the data populator, the method 100 causes the data populator to write data items to a data store (block 108) while monitoring a parameter of a data acquisition system (block 110). By way of example, the data store may be a memory, and the data items may be in-memory data objects (i.e., objects that are created as a result of executing an object-oriented programming paradigm). The parameter may be the availability of new data that needs to be operated on by the data acquisition system (which may include the data populator and the data store), or the fullness of the data store. Other parameters, and combinations of parameters, may also be monitored.

In response to the parameter monitored by the method 100, execution of the secondary threads is controlled with respect to the primary thread to manage access to the data store, and the data items therein, by the number of data formatters (block 112). If the monitored parameter is fullness of the data store, then execution of the secondary threads with respect to the primary thread may be controlled by 1) suspending the primary thread, and enabling ones of the secondary threads to execute, upon the fullness of the data store exceeding a first threshold, and 2) activating the primary thread upon the fullness of the data store falling below a second threshold. By monitoring the fullness of the data store, the data store can be prevented from overflowing. And, by monitoring two thresholds of data store fullness, a ping-ponging of thread suspension/activation can be avoided.

By controlling execution of the secondary threads with respect to the primary threads, the data acquisition system can generate data, and the data populator can populate the data store, at full speed, or in accord with any desired performance objective. The data formatters can then be granted access to the data store at times when their access will not impact the desired performance objectives of the data acquisition system or data populator. This can be especially useful in testing environments such as circuit test environments (where the data items pertain to test of at least one device under test (DUT)).

Figure 2:
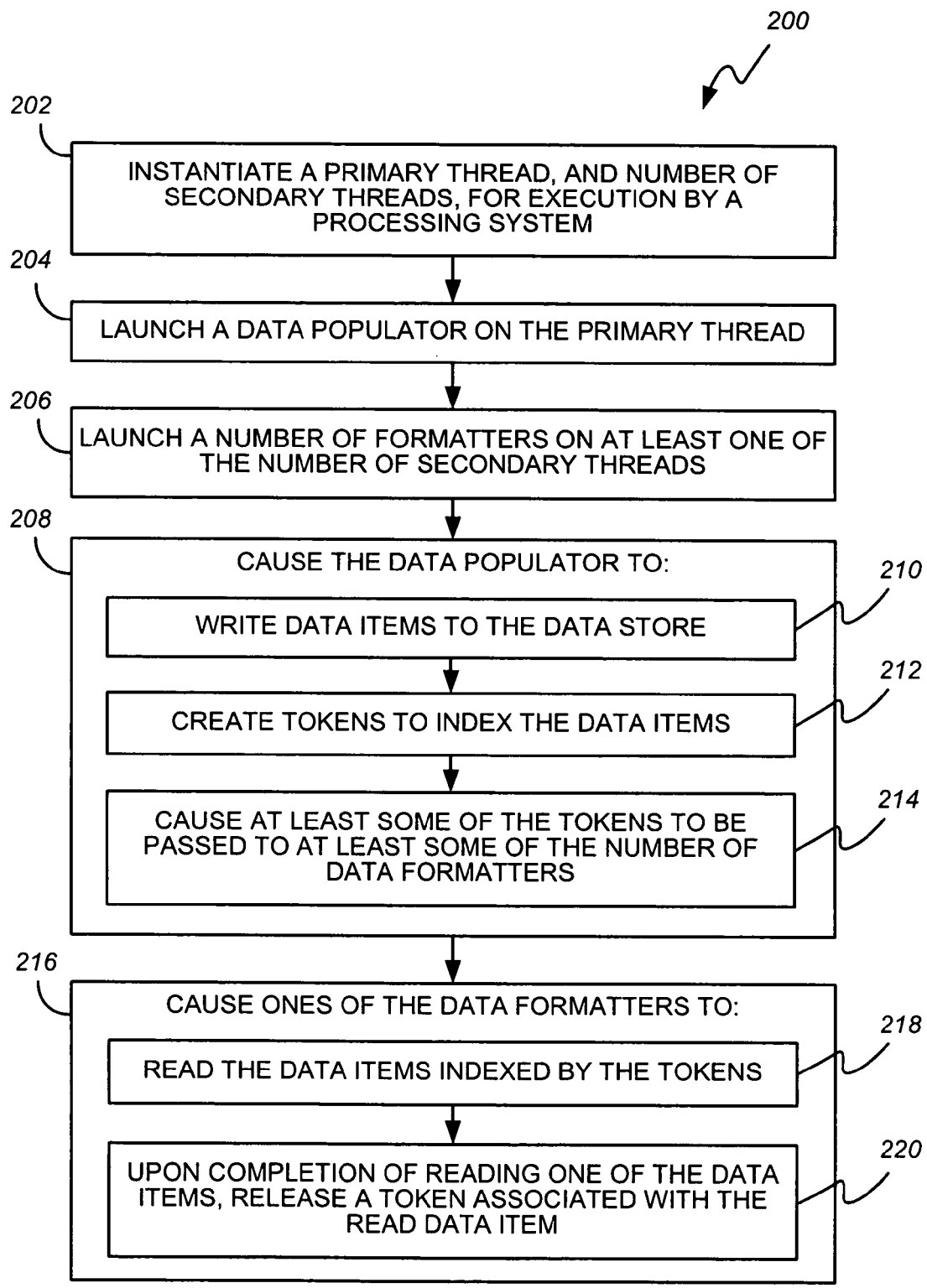
FIG. 2 illustrates a second exemplary method for managing access to a data store.

FIG. 2 illustrates a second exemplary method 200 for managing access to a data store. In accord with the method 200, a primary thread and a number of secondary threads are instantiated for execution by a processing system (see block 202). A data populator is then launched on the primary thread (block 204), and a number of data formatters are launched on at least one of the number of secondary threads (block 206). In one embodiment, a single data formatter is launched on each of the secondary threads. In other embodiments, one or more of the secondary threads may each have multiple data formatters executing therein.

After launching the data populator, the method 200 (at block 208) causes the data populator to 1) write data items to a data store (block 210); 2) create tokens to index the data items (block 212); and 3) cause at least some of the tokens to be passed to at least some of the number of data formatters (block 214). In one embodiment, the tokens are passed directly to the data formatters. In another embodiment, the tokens are passed to the data formatters via a notification manager, as will be described in more detail later in this description. By way of example, the data store may be a memory data objects. Also, and by way of example, the tokens may reference a memory location, an object, a record number, a file name, a line number, or any other identifier that is associated with a data item.

After launching the number of formatters, the method 200 (at block 216) causes ones of the formatters to 1) read the data items indexed by the tokens (block 218); and 2) upon completion of reading one of the data items, release a token associated with the read data item (block 220). When a data item is no longer indexed by any token, it may be deleted from the data store (e.g., by the data populator, or by another process).

By instantiating the primary thread with a higher execution priority than the number of secondary threads, the data formatters can again be granted access to the data store at times when their access will not impact the desired performance objectives of a data acquisition system or the data populator. Alternately, there may be cases where it would be desirable to give the secondary threads priority over the primary thread.

It is noted that the orders of the method steps shown in FIGS. 1 and 2 are not critical, and other orders of their steps, including parallel processing of steps, is possible.

The methods 100, 200 shown in FIGS. 1 and 2 may be implemented by means of computer readable code stored on computer readable media. The computer readable media may include, for example, any number or mixture of fixed or removable media (such as one or more only memories (ROMs), or compact discs), at either a single location or distributed over a network. The computer readable code will typically comprise software, but could also comprise firmware or a programmed circuit.

Figure 3:
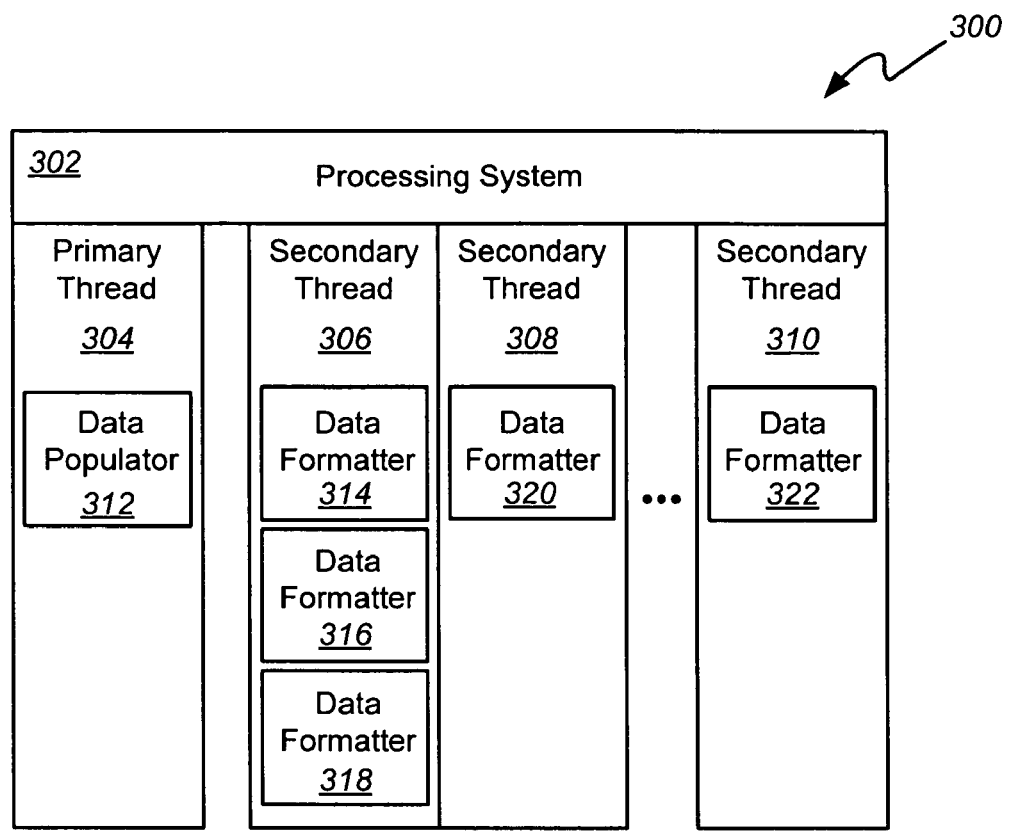
FIG. 3 illustrates an exemplary block diagram of a processing system executing multiple threads, as required by the method of FIG. 1 or 2.

FIG. 3 illustrates an exemplary block diagram of apparatus 300 executing multiple threads 304, 306, 308, 310, as would be instantiated by executing the method of FIG. 1 or 2. The processing system 302 may comprise at least one processor, and at least one operating system instance, for executing the threads 304, 306, 308, 310. A data populator 312 is launched on the primary thread 304, and a number of data formatters 314, 316, 318, 320, 322 are launched on the number secondary threads 306, 308, 310. Note that a plurality of data formatters 314, 316, 318 are launched on the secondary thread 306.

In one embodiment, the primary and secondary threads 304, 306, 308, 310 are instantiated at the same priority level. In another embodiment, the primary thread 304 is instantiated at a higher priority level than the number of secondary threads 306, 308, 310, or vice versa.

Figure 4:
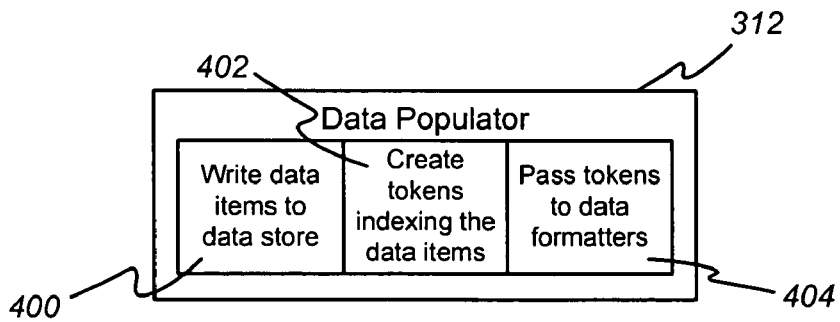
FIG. 4 illustrates an exemplary block diagram of the data populator shown in FIG. 3.

FIG. 4 illustrates an exemplary block diagram of a data populator, such as the data populator 312. The data populator 312 comprises code pieces 400, 402, 404 to 1) write data items to a data store; 2) create tokens indexing the data items; and 3) pass the tokens to the number of formatters 314, 316, 318, 320, 322.

Figure 5:
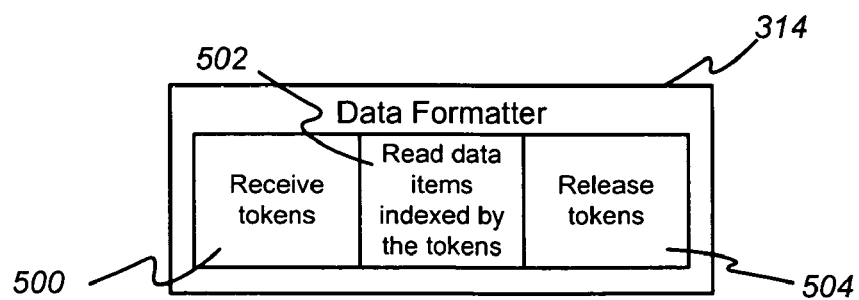
FIG. 5 illustrates an exemplary block diagram of one of the data formatters shown in FIG. 3.

FIG. 5 illustrates an exemplary block diagram of a data formatter, such as the data formatter 314. The data formatter 314 comprises code pieces 500, 502, 504 to 1) receive tokens; 2) read the data items indexed by the token; and 3) release the tokens.

The methods 100, 200 can be used in many applications, one being the storing and formatting of test results such as circuit test results. In one particular application, the test results may be generated by a 93000 SOC Series tester offered by Agilent Technologies, Inc.

The 93000 SOC Series tester (hereinafter referred to as the "93000 tester") is an SOC (System On a Chip) tester that logs test results and events to a binary data file known as an EDL (Event Data Logging) file 600. See FIG. 6. The events in this EDL file 600 correspond to the execution of a plurality of tests on at least one device under test (DUT), and are stored in an ordered sequence. However, the events stored in the EDL file 600 are not "thrown" to any other process, and are merely logged to the EDL file 600. In such an application, 1) a file corresponding to a plurality of events (e.g., an EDL file 600) may be parsed to retrieve the plurality of events, and then 2) the events retrieved from the data file may be passed to a process (e.g., the data populator 608) that creates a plurality of data objects and stores data in memory 610.

Figure 6:
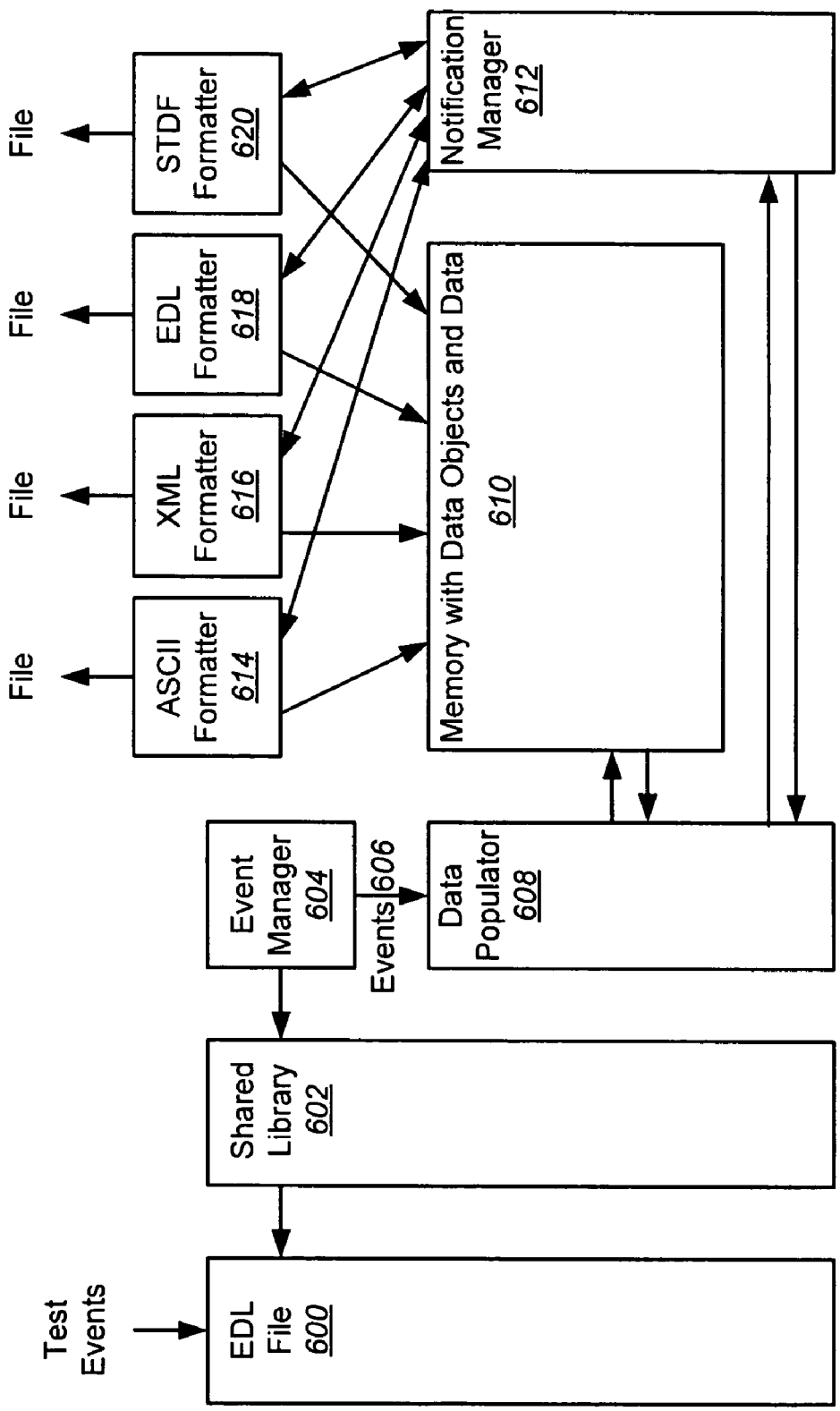
FIG. 6 illustrates an exemplary system for managing access to a data store.

In one embodiment, the EDL file 600 is parsed in response to method calls made by an event manager 604. As shown in FIG. 6, the event manager 604 may make method calls (e.g., get event; get event attribute) to a shared library 602, and the shared library 602 may then retrieve events from the EDL file 600 and "throw" them to the event manager 604. The event manager 604 then passes the events 606 to the data populator 608.

The shared library 602 may take the form of compiled code, such as a data retrieval library (DRL), that executes a method or methods when called by the event manager 604.

The data populator 608 may store data objects in the memory 610, and then relate the data objects to one another, in a variety of ways. However, in one embodiment, they are related to one another in a hierarchical tree structure. Data objects that are children of other data objects may maintain pointers to their parent data objects, but parent objects need not maintain a list of pointers to all of their children. As will be explained later in this description, these pointers from children to their parents can aid the process of deleting data objects that are no longer needed.

Data items may be related to data objects in various ways, including, by 1) directly storing data items within the data objects, or 2) storing data items in data structures that are related to the data objects (e.g., related by pointers or other means).

In an EDL file 600, data is stored as attributes of events. Thus, if the data populator 608 receives events 606 drawn from an EDL file 600, the data populator 608 may extract data items corresponding to events by extracting the data items from attributes of the events. In the case of circuit test, the extracted data may comprise test results.

There are many ways in which the data formatters 614, 616, 618, 620 may access the data objects and data items that are created by the data populator 608. In one embodiment, the data formatters 614, 616, 618, 620 can simply monitor the data objects. However, this can require a lot of memory bandwidth, and is often not very efficient. In a preferred embodiment, the data populator 608 creates tokens that index the data items it creates, and then passes the tokens to a notification manager 612. The notification manager 612 then distributes ones of the tokens to ones of the data formatters 614, 616, 618, 620.

It is noted that the notification manager 612 need only receive one token for each data object. The notification manager 612 can then replicate the token, or broadcast it, to each of the data formatters 614, 616, 618, 620. Alternately, the notification manager 612 may not replicate or broadcast the token for/to each of the data formatters 614, 616, 618, 620, and may only replicate or broadcast the token for/to certain ones of the data formatters 614, 616, 618, 620 that have subscribed for a type of data item that is represented by the data object.

Typically, the operation of the data populator 608 will be given priority over the operation of the data formatters 614, 616, 618, 620. To further control access to the memory 610 in which the data objects and data are stored, the data populator 608 may be provided with direct access to the data objects and the data items. However, the number of data formatters 614, 616, 618, 620 may be provided with access to the plurality of data objects via a structured interface that coordinates/arbitrates the data formatters' access to the data objects and data.

To reduce the number of data objects that is maintained in the memory 610, the data populator 608 may monitor reservations of the data objects, and may delete data objects (or data items) that are no longer reserved by any object or process that references or accesses the data objects. In one embodiment, a data object is considered reserved when a token is created to index the data object. The data populator 608 may generate one such token upon creation of the data object, and the notification manager 612 may generate and distribute additional copies of this token to the data formatters 614, 616, 618, 620. The data populator 608 may also generate a pointer to an object (or indexing token) when a child object of the data object is created. As tokens are generated, a count of the number of tokens that reference a particular data object (or data item) may be maintained (possibly within the data object itself). The data formatters 614, 616, 618, 620 and other processes can then be programmed to relinquish their token that indexes a data object when they have finished accessing the data object, and the data populator 608 can delete the data object when all such tokens have been released. Due to child objects referencing their parents, a parent object cannot be deleted until all of its children are first deleted.

The data formatters shown in FIG. 6 may take various forms, including forms such as an ASCII (American Standard Code for Information Interchange) formatter 614, an XML (extensible Markup Language) formatter 616, an EDL formatter 618 and/or an STDF (Standard Test Definition Format) formatter 620.

Figure 7:
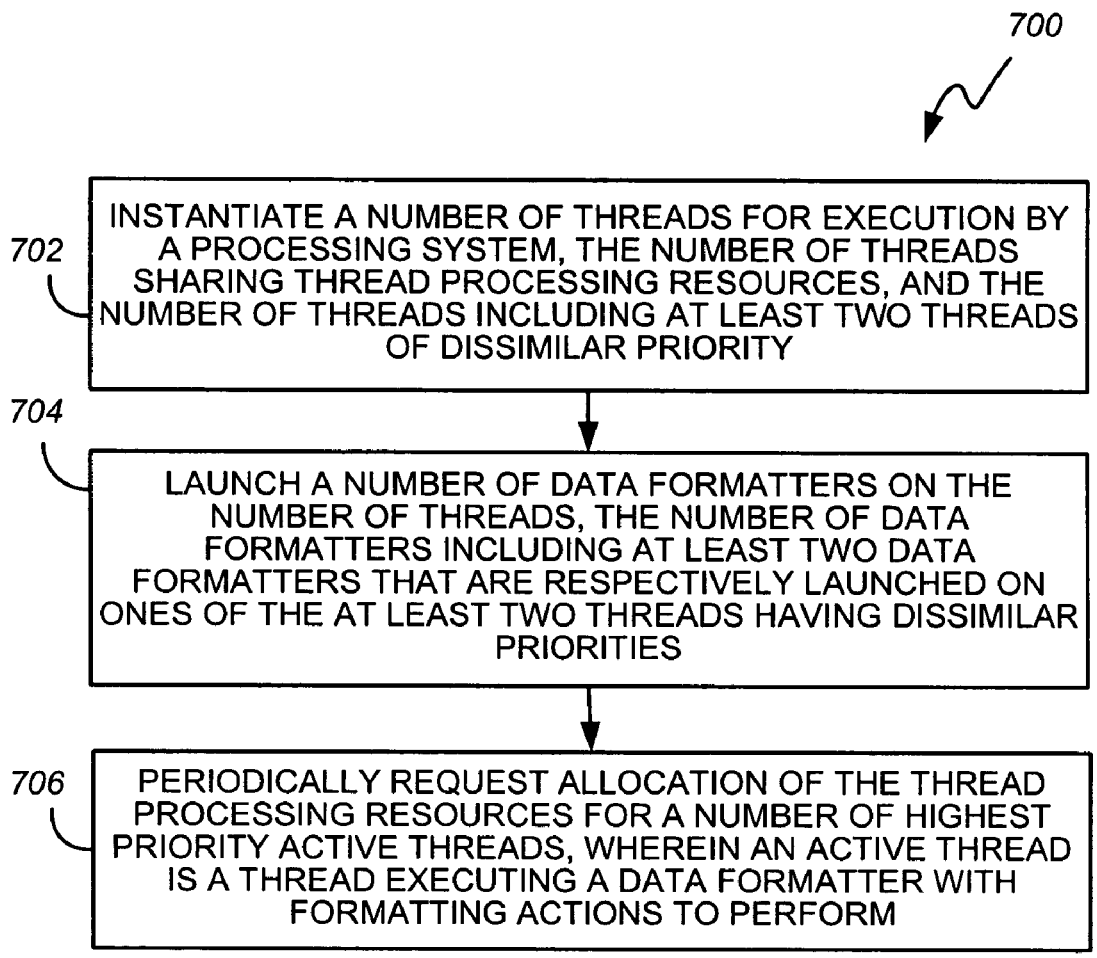
FIG. 7 illustrates an exemplary method for prioritizing formatting actions of a number of data formatters.

In addition to controlling execution of the thread 304 (FIG. 3) in which the data populator 312 executes with respect to the threads 306, 308, 310 in which the data formatters 314, 316, 318, 320, 322 execute, the execution priority of the data formatter threads 306, 308, 310 may also be controlled. In this manner, some data formatters may be given priority over other data formatters by placing higher priority formatters in higher priority threads. It may be desirable to give some formatters priority, for example, because their outputs can be generated in more or less real-time, because their outputs can be generated with little impact on thread processing resources, or because their outputs are more critical for evaluation of the testing process. FIG. 7 therefore illustrates an exemplary method 700 for prioritizing the formatting actions of a number of data formatters 314, 316, 318, 320, 322.

The method 700 comprises instantiating a number of threads, such as the secondary threads 306, 308, 310 shown in FIG. 3, for execution by a processing system 302 (block 702). The number of threads 306, 308, 310 share thread processing resources, such as the processing system 302; and the number of threads 306, 308, 310 include at least two threads 306, 308 of dissimilar priority. A number of data formatters 314, 316, 318, 320, 322 are then launched on the number of threads (block 704), with the number of data formatters including at least two data formatters 314, 320 that are respectively launched on ones 306, 308 of the at least two threads having dissimilar priorities.

After launching the data formatters 314, 316, 318, 320, 322, allocation of the thread processing resources is periodically requested for a number of highest priority active threads, wherein an active thread is a thread executing a data formatter with formatting actions to perform (block 706). By way of example, a data formatter's formatting actions may comprise reading data items, formatting data items, and outputting formatted data.

Requests for resource allocation are made "periodically" so that a low priority data formatter with lots of work to do does not usurp control of thread processing resources and prevent higher priority data formatters from getting any work done.

Preferably, a request for allocation of thread processing resources is a request for exclusive allocation of thread processing resources. Higher priority data formatters are therefore able to perform their formatting actions before other data formatters, and other data formatters are allowed to "catch up" when the higher priority formatters have no work to do. At times, this "catch up" time may be when a tester pauses for changes in test setups.

It is understood that various programming languages, paradigms, and hardware platforms may be used to implement the teachings herein. In oriented programming techniques are employed to develop the data objects stored in the memory 610 (FIG. 6). In another embodiment, a procedural language is employed to develop the data elements and processing logic. It is also understood that the term "release" includes "marked for deletion" wherein an operating system or other process is made aware that memory or storage previously allocated has been released by its owner and is available for use.

What is claimed is:

1. A method of prioritizing formatting actions of a number of data formatters, comprising:

instantiating a number of threads for execution by a processing system, the number of threads sharing thread processing resources, and the number of threads including at least two threads of dissimilar priority, wherein the number of threads includes at least one thread of high priority having a higher execution priority than at least one thread of low priority;

launching a number of data formatters on the number of threads, each of the data formatters accessing circuit test data items in a data store, and each of the data formatters outputting a different set of formatted test data for analysis by a person or application program, wherein the number of data formatters includes at least two data formatters that are respectively launched on ones of the at least two threads having dissimilar priorities; and periodically requesting allocation of the thread processing resources for a number of highest priority active threads, thereby giving priority to the formatting actions performed by any of the data formatters that are launched on the number of highest priority active threads, wherein an active thread is a thread executing a data formatter with formatting actions to perform, wherein the number of highest priority active threads includes the at least one thread of high priority.

2. The method of claim 1, wherein the periodic requests are requests for exclusive allocation of the thread processing resources for the number of highest priority active threads.

3. The method of claim 1, wherein the data store is a memory, and wherein the data items are associated with objects in the memory.

4. The method of claim 1, further comprising:
launching a data populator on one of the number of threads;
causing the data populator to perform the actions of,
    writing the circuit test data items to the data store;
    creating tokens to index the circuit test data items; and
    causing at least some of the tokens to be passed to at least some of the number of data formatters; and
causing ones of the data formatters to perform formatting actions,
    including, reading the circuit test data items indexed by the tokens; and
    upon completion of reading one of the circuit test data items, releasing a token associated with the read circuit test data item.

5. The method of claim 4, wherein the thread on which the data populator is launched is instantiated with a higher execution priority than the number of threads on which the data formatters are launched.

6. The method of claim 4, wherein:
creating tokens to index the circuit test data items comprises, for each circuit test data item,
    causing the data populator to create an initial token to index the circuit test data item; and
    passing the initial token to a notification manager; and
the method further comprises, in response to the initial tokens, and via the notification manager, passing tokens to ones of the data formatters.

7. The method of claim 6, further comprising, launching the notification manager on one of the number of threads.

8. The method of claim 6, further comprising:
receiving, from the data formatters, subscriptions for circuit test data items of a number of data types; and
in response to the initial tokens, and via the notification manager, passing tokens to ones of the data formatters in accord with 1) data types of the circuit test data items indexed by the initial tokens, and 2) the subscriptions of the data formatters.

9. A system or prioritizing formatting actions of a number of data formatters, comprising:
computer readable media; and
computer readable code, stored on the computer readable media, including,
    code to instantiate a number of threads for execution by a processing system, the number of threads sharing thread processing resources, and the number of threads including at least two threads of dissimilar priority, wherein one of the threads of dissimilar priority has a higher execution priority than another one of the threads of dissimilar priority;
    code to launch a number of data formatters on the number of threads, each of the data formatters accessing circuit test data items in a data store, and each of the data formatters outputting a different set of formatted test data for analysis by a person or application program, wherein the number of data formatters includes at least two data formatters that are respectively launched on ones of the at least two threads having dissimilar priorities; and
    code to periodically request allocation of the thread processing resources for a number of highest priority active threads, thereby giving priority to the formatting actions performed by any of the data formatters that are launched on the number of highest priority active threads, wherein an active thread is a thread executing a data formatter with formatting actions to perform, wherein the number of highest priority active threads includes the at least one thread of high priority.

10. The system of claim 9, wherein the periodic requests are requests for exclusive allocation of the thread processing resources for the number of highest priority active threads.

11. The system of claim 9, wherein the data store is a memory, and wherein the circuit test data items are associated with objects in the memory.

12. The system of claim 9, further comprising:
code to launch a data populator on one of the number of threads;
code to cause the data populator to perform the actions of,
writing the circuit test data items to the data store;
creatine tokens to index the circuit test data items; and
causing at least some of the tokens to be passed to at least some of the number of data formatters; and
code to cause ones of the data formatters to perform formatting actions, including,
    reading the circuit test data items indexed by the tokens; and
    upon completion of reading one of the circuit test data items, releasing a token associated with the read circuit test data item.

13. The system of claim 12, wherein the thread on which the data populator is launched is instantiated with higher execution priority than the number of threads on which the data formatters are launched.

14. The system of claim 12, wherein:
creating tokens to index the circuit test data items comprises, for each circuit test data item,
    causing the data populator to create an initial token to index the circuit test data item; and
    passing the initial token to a notification manager; and
the system further comprises code to, in response to the initial tokens, and via the notification manager, pass tokens to ones of the data formatters.

15. The system of claim 14, further comprising, code to launch the notification manager on one of the number of threads.

16. The system of claim 14, further comprising:
code to receive, from the data formatters, subscriptions for circuit test data items of a number of data types; and
code to, in response to the initial tokens, and via the notification manager, pass tokens to ones of the data formatters in accord with 1) data types of the circuit test data items indexed by the initial tokens, and 2) the subscriptions of the data formatters.

* * * * *